US010561935B2

(12) United States Patent
Tiffany et al.

(10) Patent No.: US 10,561,935 B2
(45) Date of Patent: Feb. 18, 2020

(54) THUMBSTICK FOR USER INPUT DEVICE (71) Applicant: Microsoft Technology Licensing, LLC, Redmond, WA (US)

(72) Inventors: Dustin John Tiffany, Kirkland, WA (US); Benjamin Michael Finney, Woodinville, WA (US); Aaron Schmitz, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 398 days.

(21) Appl. No.: 15/408,302

(22) Filed: Jan. 17, 2017

(65) Prior Publication Data
US 2018/0200617 A1    Jul. 19, 2018

(51) Int. Cl.
*A63F 13/24* (2014.01)
(52) U.S. Cl.
CPC .................. *A63F 13/24* (2014.09)
(58) Field of Classification Search
CPC ....................................... A63F 13/24
USPC .......................................... 463/38
See application file for complete search history.

(56) References Cited

U.S. PATENT DOCUMENTS

| 4,395,134 A | 7/1983 | Luce |
| 4,590,339 A | 5/1986 | Scott-Jackson et al. |
| 4,721,274 A | 1/1988 | Erb |
| 5,278,557 A | 1/1994 | Stokes et al. |
| 6,362,810 B1 | 3/2002 | Matsuda |
| 6,892,597 B2 | 5/2005 | Tews |
| 7,338,374 B2 | 3/2008 | Hammond et al. |
| 7,463,241 B2 | 12/2008 | Ushimaru et al. |
| 7,758,424 B2 | 7/2010 | Riggs et al. |
| 7,993,203 B1 | 8/2011 | Walker, II et al. |

(Continued)

FOREIGN PATENT DOCUMENTS

| CA | 2147575 A1 | 10/1996 |
| CN | 2843562 Y | 12/2006 |

(Continued)

OTHER PUBLICATIONS

"International Search Report and Written Opinion Issued in PCT Application No. PCT/US2018/012444", dated Apr. 5, 2018, 14 Pages.

(Continued)

*Primary Examiner* — Omkar A Deodhar
*Assistant Examiner* — Wei Lee
(74) *Attorney, Agent, or Firm* — Alleman Hall Creasman & Tuttle LLP (57) ABSTRACT

A thumbstick for a user input device comprises a tiltable post operable to output a control signal based on its position, with the post comprising external threads and a post anchor feature. An adjustable tensioning mechanism is configured to modify a tilt tension of the post. A cap comprises a cylindrical stem that defines a cavity. A base is moveable with the post and comprises a first cylindrical portion extending into the cavity, and a second cylindrical portion comprising internal threads and a base anchor feature. The internal threads mate with the external threads of the post to fasten the post to the base, and the base anchor feature abuts the post anchor feature to prevent displacement of the base toward the proximal end of the post.

20 Claims, 6 Drawing Sheets

(56) References Cited

U.S. PATENT DOCUMENTS

| | | | |
|---|---|---|---|
| 8,264,458 | B2 | 9/2012 | Cooper et al. |
| 8,496,528 | B2 | 7/2013 | Muramatsu |
| 8,519,282 | B2 | 8/2013 | Ohshima et al. |
| 8,784,208 | B2 | 7/2014 | Borrel |
| 2005/0255915 | A1 | 11/2005 | Riggs et al. |
| 2005/0255918 | A1 | 11/2005 | Riggs et al. |
| 2007/0164996 | A1 | 7/2007 | Gould |
| 2009/0239665 | A1 | 9/2009 | Minuto et al. |
| 2009/0295724 | A1 | 12/2009 | Cheng et al. |
| 2010/0167825 | A1 | 7/2010 | Sternberg et al. |
| 2010/0298053 | A1 | 11/2010 | Kotkin |
| 2011/0105231 | A1 | 5/2011 | Ambinder et al. |
| 2011/0240454 | A1* | 10/2011 | Ohshima ............... G05G 9/047 200/6 A |
| 2012/0172128 | A1 | 7/2012 | Atzmon |
| 2012/0274563 | A1 | 11/2012 | Olsson |
| 2016/0361634 | A1 | 12/2016 | Gassoway et al. |
| 2017/0001106 | A1 | 1/2017 | Gassoway et al. |

FOREIGN PATENT DOCUMENTS

| | | |
|---|---|---|
| CN | 203123534 U | 8/2013 |
| EP | 2113819 A2 | 11/2009 |
| GB | 2364367 A | 1/2002 |
| JP | H11353047 A | 12/1999 |
| KR | 101124507 B1 | 3/2012 |
| WO | 2005049159 A2 | 6/2005 |
| WO | 2014009008 A1 | 1/2014 |
| WO | 2016200548 A1 | 12/2016 |

OTHER PUBLICATIONS

Brooks, et al., "Design of a Haptic Joystick for Shared Robot Control", In Proceedings of the seventh annual ACM/IEEE international conference on Human-Robot Interaction, Mar. 5, 2012, pp. 113-114.

U.S. Appl. No. 14/734,941, "Game Controller With User-Replaceable Thumbstick Top", filed Jun. 9, 2015. 79 pages.

U.S. Appl. No. 14/788,160, "Thumbstick With Adjustable Tension", filed Jun. 30, 2015. 63 pages.

U.S. Appl. No. 15/192,843, "Adjustable Tension Thumbstick", filed Jun. 24, 2016. 84 pages.

U.S. Appl. No. 15/192,897, "Adjustable Tension Thumbstick", filed Jun. 24, 2016. 84 pages.

"Interference fit", Published Date: Nov. 12, 2016, 3 pages. Available at: https://en.wikipedia.org/wiki/Interference_fit.

"Gamester Phoenix Revolution—Instruction Manual", http://service.mattel.com/instruction_sheets/I4160.pdf, Jul. 6, 2004, 1 page.

HSAI, "Razer Onza Tournament Edition Wired Xbox360 Controller", PinoyXbox website, Xbox 360 Forums, http://www.pinoyxbox.com/forum/viewtopic.php?f=11&t=38391, Feb. 8, 2011, 2 pages.

Ashcraft, B., "Just How Good Is the Razer Onza Tournament Edition? Quite Good.", KOTAKU website, http://kotaku.com/5793875/just-how-good-is-the-razer-onza-tournament-edition-quite-good/, Apr. 20, 2011, 17 pages.

"Xbox 360 Controller Razer Onza Tournament Edition", GameStop website, http://www.gamestop.com/xbox-360/accessories/xbox-360-controller-razer-onza-tournament-edition/97812, Nov. 28, 2011, 7 pages.

Pionneau, F., "Review / Mad Catz MLG Pro Circuit Controller", Digital Versus website, http://www.digitalversus.com/gamepad-controller/madcatz-mlg-pro-circuit-controller-p14514/test.html, Oct. 10, 2012, 7 pages.

Scott, D., ""Two Finger Solution"—Transmitter Handling Tips to Maximize Flying Consistency and Proficiency", Available at: http://www.rcflightschool.com/TransmitterHandling.pdf, Jan. 22, 2013, 5 pages.

Davies, C., "Xbox One controller gets deep-dive treatment", Slash Gear website, http://www.slashgear.com/xbox-one-controller-gets-deep-dive-treatment-06285219/, Jun. 6, 2013, 3 pages.

Dikeman, A., "Battle Beaver Custom's Controller Review", Halo Follower website, http://halofollower.com/battle-beaver-customs-controller-review/, Jan. 8, 2015, 4 pages.

"Grass Valley OCP 400 User Manual: Joystick", ManualsLib website, Available at: http://www.manualslib.com/manual/904041/Grass-Valley-Ocp-400.html?page=11, Available as early as Jan. 2010, Retrieved Apr. 21, 2016, 3 pages.

"Spektrum DX8 Instruction Manual: Adjustable Stick Tension; Advanced Range Testing", ManualsLib website, Available at: http://www.manualslib.com/manual/730948/Spektrum-Dx8.html?page=41, Available as early as Aug. 2010, Retrieved Apr. 21, 2016, 3 pages.

ISA European Patent Office, International Search Report and Written Opinion issued in Application No. PCT1US2016037461, dated Dec. 13, 2016, WIPO, 19 pages.

* cited by examiner

THUMBSTICK FOR USER INPUT DEVICE

BACKGROUND

Handheld device controllers may include one or more thumbsticks that enable users to provide input. A thumbstick may be a stick-shaped feature that is positioned to be manipulated by a thumb of a user.

SUMMARY

In some examples, a thumbstick for a user input device may comprise a tiltable post operable to output a control signal based on a position of the tiltable post relative to a default position. The tiltable post comprises external threads at a distal end, a post anchor feature, and a proximal end opposite to the distal end. The thumbstick includes an adjustable tensioning mechanism configured to modify a tilt tension of the tiltable post. A cap comprises a cylindrical stem that defines a cavity.

A base is moveable with the tiltable post and comprises a first cylindrical portion extending into the cavity of the cylindrical stem of the cap. A second cylindrical portion is coaxial with the first cylindrical portion, and comprises internal threads and a base anchor feature. The internal threads mate with the external threads of the tiltable post to fasten the tiltable post to the base, and the base anchor feature abuts the post anchor feature of the tiltable post.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

User input devices may include one or more user-actuatable control elements with which a user may provide input. Each of these control elements may be manipulated by a user to generate various control signals for interacting with another machine or device. For example, a user input device may be designed to be held in two hands and may include one or more user-actuatable thumbsticks, buttons, triggers, directional pads, touch pads, etc.

Examples of such user input devices include game controllers that may be designed to facilitate user interaction with a video game or other application executing on a computer, video game console, or other platform. For example, a game controller may provide a means by which a user can control a character or object within a video game. Other handheld user input device may be used to remotely control a vehicle or other machine, such as an unmanned aircraft (e.g., a drone), or a land-based vehicle, robot, crane, etc.

As noted above, some user input devices may include one or more thumbsticks. A thumbstick is a user input device component that may be manipulated by a user along two or more axes for controlling or otherwise interacting with a machine, computing device, computer program such as a video game or other application, etc. For example and as explained in more detail below, a thumbstick may be configured for manipulation in two axes (e.g., X and Y) about a pivoting base portion. In some examples, a thumbstick configured for manipulation about a pivoting portion also may be configured to receive a click selection along another axis (e.g., the Z axis).

Some examples of a thumbstick may include two inter-related parts: a thumbstick cap with which the user interacts, and a joystick module that is coupled to the cap, either directly or indirectly, and includes a shaft that can travel in two or three axes. In some examples the cap may be attached to the shaft via an interference fit, either directly or through one or more intervening components. With some interference fits, however, the connection may degrade over time and the thumbstick cap may work its way loose relative to the shaft. This may allow the cap to slide or move relative to the shaft during use, which can negatively impact the user's experience.

Further, some thumbsticks may provide tension-adjustment functionality to accommodate different users with different preferences for the tension applied to a thumbstick during manipulation. For example, a thumbstick with higher tension provides greater resistance to being tilted by a user's thumb or finger relative to a thumbstick with lesser tension. Some users may prefer higher tilt tension in a thumbstick, while others may prefer a lower tilt tension. In some configurations of adjustable tension thumbsticks, an upward spring force is continually urging the cap to slide from the shaft. In these configurations, such spring force may accelerate the degradation of an interference fit between the cap and shaft.

Additionally, interference fits may be available for plastic-on-plastic connections or plastic-on-metal combinations, such as a metal shaft press-fitted into a plastic cap or intervening component, or a metal cap or intervening component press-fitted onto a plastic shaft. However, plastic components have shorter duty cycles and are more subject to fatigue and breakage than metal components. Lighter weight plastic components also may provide a less-than-premium user experience. Additionally, metal-on-metal interference fits are expensive or impossible to manufacture due to the stiffness of the materials and mechanical tolerances of the fitting parts.

Accordingly, examples disclosed herein provide adjustable-tension thumbsticks and associated user input devices that utilize a threaded engagement between a tiltable post and a base coupled to the thumbstick cap. The tiltable post may be operable to output a control signal based on a position of the tiltable post relative to a default position. The tiltable post comprises external threads at a distal end, a post anchor feature, and a proximal end opposite to the distal end. An adjustable tensioning mechanism is configured to modify a tilt tension of the tiltable post.

The thumbstick cap comprises a cylindrical stem that defines a cavity. The base is moveable with the tiltable post and comprises a first cylindrical portion extending into the cavity of the cylindrical stem of the cap. A second cylindrical portion is coaxial with the first cylindrical portion, and comprises internal threads and a base anchor feature. The internal threads mate with the external threads of the tiltable post to fasten the tiltable post to the base. The base anchor feature abuts the post anchor feature to prevent displacement of the base relative to the tiltable post toward the proximal end of the tiltable post.

Figure 1:
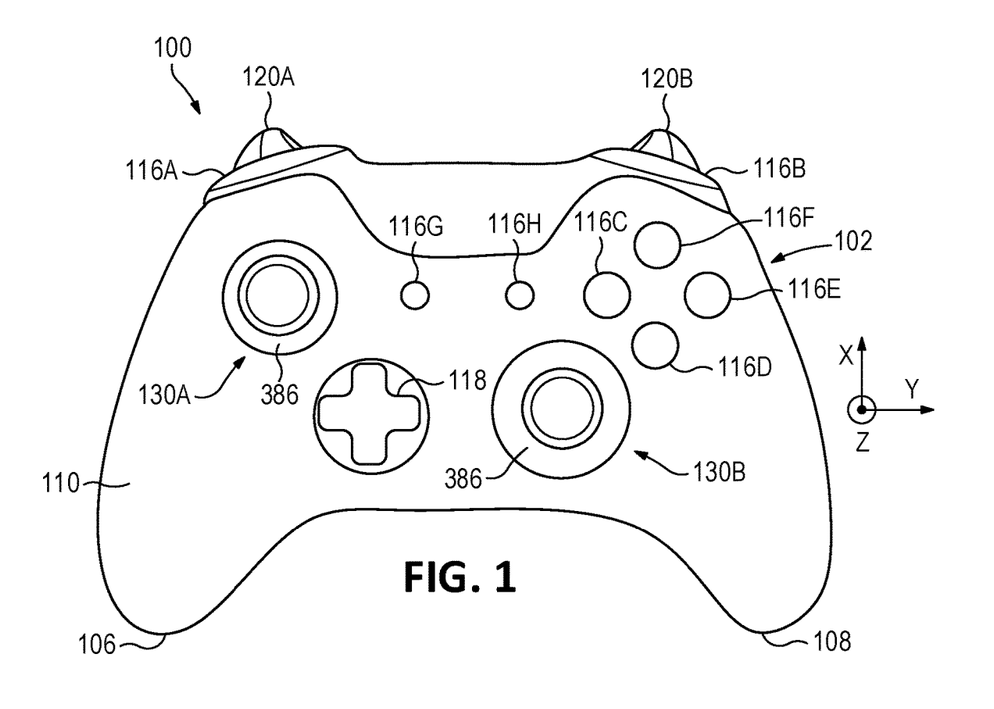
FIG. 1 shows a top view of a game controller that includes two thumbsticks according to examples of the present disclosure.
Figure 2:
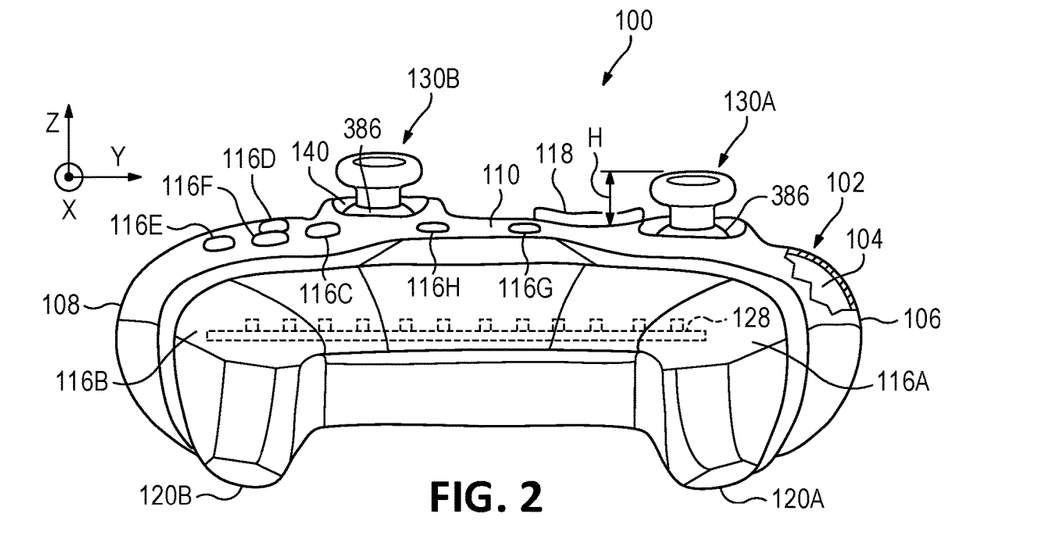
FIG. 2 shows a front end view of the game controller of FIG. 1 according to examples of the present disclosure.

With reference now to FIGS. 1 and 2, an example user input device in the form of a game controller 100 is provided. Game controller 100 is provided as an example of a user input device for purposes of illustration, and is not intended to be limiting. Other user input devices to which the present disclosure may apply (game controllers, air and land vehicle controllers, etc.) may have different shapes, different sizes, different numbers and/or placements of user interface features (thumbsticks, buttons, knobs, switches, triggers, pads, etc.), and/or other differences from game controller 100 shown in FIGS. 1 and 2.

The game controller 100 may be configured to translate user input into control signals that are provided to a computing device, such as a gaming console. For example, the game controller 100 may be configured to send control signals via a wired or wireless connection to a computing device. The control signals may be mapped to commands to control a video game or other program or application.

The game controller 100 includes a housing 102 that defines an internal chamber 104. The housing 102 is configured to be held by a user with two hands. As such, the housing 102 includes a left-hand portion 106 configured to be gripped by a left hand and a right-hand portion 108 configured to be gripped by a right hand. When a user holds the controller 100 with two hands such that the left hand grips the left-hand portion 106 and the right hand grips the right-hand portion 108, the user's thumbs may naturally interface with a thumb-side surface 110 of the housing 102.

The game controller 100 includes a plurality of controls configured to generate different control signals responsive to thumb and/or finger manipulation. The controls of game controller 100 include a plurality of action buttons 116 (e.g., 116A, 116B, 116C, 116D, 116E, 116F, 116G, and 116H), a directional pad 118, a left trigger 120A and a right trigger 120B. The game controller 100 may include any suitable number and type of controls.

In this example implementation and as described in more detail below, the controls include a left thumbstick 130A and a right thumbstick 130B that may be manipulated by a user's thumbs. Each of the thumbsticks 130A and 130B may comprise a joystick assembly (not shown in FIGS. 1 and 2) that is located at least partially in the internal chamber 104 of the game controller 100. In the current example and as described in more detail below, thumbsticks 130A and 130B are configured to tilt from a default position when moved by a thumb (or finger) relative to a pivoting location within the internal chamber 104 of the controller.

In FIGS. 1 and 2, thumbsticks 130A and 130B are shown in a default position in which the thumbsticks extend vertically above the thumb-side surface 110 of the housing 102 in a centered, non-tilted position. When tilted (e.g., pushed sideways in a y-axis direction and/or forward/back in an x-axis direction) by a thumb or finger of a user, thumbsticks 130A and 130B may tilt in any direction from center, and may be tilted by any degree/angle of tilt until a stop angle is reached. Tilting one or more of thumbsticks 130A and 130B may transmit input signals causing an action in a game, such as a particular motion of a character, an operation in a remotely-controlled device (e.g., increasing a propeller speed in a drone), and/or other action or response in another device or program. In some examples, one or more of thumbsticks 130A and 130B also may be configured to receive a click selection along the z-axis. In this manner, a user may perform a click selection by pressing downwardly in the negative z-axis direction on the top of the thumbstick.

As described in more detail below, in some examples a thumbstick may comprise an adjustable tensioning mechanism that provides and adjusts a tilt tension of the thumbstick. For example, a thumbstick such as one or both of thumbsticks 130A and 130B may utilize an adjustable tensioning mechanism that comprises a spring that maintains the thumbstick in a default, centered, non-tilted position. The spring may be compressed when the thumbstick is tilted from the default position, and may thereby provide a resistance or "tilt tension" that is felt by the user's thumb or finger. Such tilt tension may comprise a return force that urges the thumbstick back towards its default position.

In examples described herein, the thumbstick may comprise components that are configured to change the compression of the spring. The greater the amount of compression of the spring, the greater the tilt tension and resistance to tilting of the thumbstick. The lesser the amount of compression of the spring, the lesser the tilt tension and resistance to tilting of the thumbstick.

In some examples described herein, the thumbstick tilt tension may be adjusted by a user gripping a thumbstick cap between the user's thumb and finger and rotating the cap to increase or decrease the tilt tension. In these examples, the user may conveniently adjust the tilt tension without disassembling the thumbstick assembly and without using a separate tool. In other examples, a tool may be used to engage an adjustment body to adjust the tilt tension. In other examples, the thumbstick cap may be removed and an adjustment body may be rotated directly by the user's thumb/finger. As described in more detail below, the tilt tension may be adjusted via an adjustable tensioning mechanism. The adjustable tensioning mechanism may be incorporated in the thumbstick or otherwise attached or coupled to the thumbstick in another manner.

In some examples, an adjustable tensioning mechanism may comprise a movable pin that protrudes from tiltable post, such that when the pin is moved vertically (along the post axis), the tilt tension of the thumbstick is adjusted. In some examples, such movement of the moveable pin adjusts the compression of a compression spring to thereby adjust the tilt tension. In other examples, other load-creating components may additionally or alternatively be utilized. For example, a compressive member may be inserted between a switch body and the thumbstick cap such that a mechanism within the cap modifies the compression of the compressive member, thereby increasing or decreasing tilt tension.

Thumbsticks 130A and 130B may be manufactured from any suitable material(s), including plastic (e.g., injection molded), metal or combination of metals/alloys, etc. As described in more detail below, examples of the present disclosure may enable a metallic cap, metallic base and metallic tiltable post to be utilized and fastened together via threaded engagement. In this manner, thumbsticks of the present disclosure may provide a heavier, higher quality, and premium user experience as compared to thumbsticks utilizing plastic or other less substantial materials for similar components. Further, utilizing a threaded engagement between a metallic base and metallic tiltable post may provide a more robust and durable connection between these components, thereby increasing the life and usability of the thumbstick, particularly with some adjustable tension configurations that may create forces opposing such connection.

With reference again to FIG. 1, housing 102 may be a single piece case or housing, or a case or housing formed of two more pieces (e.g., top and bottom portions). Housing 102 may be made from any suitable material(s), including plastic (e.g., injection molded), metal or combination of metals/alloys, etc. As described in more detail below, housing 102 may include mechanical and electrical components (e.g., a joystick assembly containing sensors) that measure the degree of tilt of thumbsticks 130A and 130B, and transmit an indication of the measure of tilt (e.g., to one or more processors contained in game controller 100 and/or in a remote component).

In the example of FIG. 1, game controller 100 includes a printed circuit board 128 located in the internal chamber 104 of the housing 102. The printed circuit board 128 may include a plurality of control-activation sensors that may correspond to the plurality of controls. In particular, each control-activation sensor may be configured to generate a control signal responsive to interaction with a corresponding control. The game controller 100 may include any suitable number and type of control-activation sensors. In some implementations, one or more control-activation sensors may be independent of any printed circuit board.

In some examples and as described in more detail below, each of the thumbsticks 130A and 130B may interact with thumbstick-activation sensors in the form of potentiometers that use continuous electrical activity to provide an analog input control signal based on a position of the thumbstick in relative to its default position. Non-limiting examples of control-activation sensors may include dome switches, tactile switches, potentiometers, Hall Effect sensors, and other electronic sensing components.

Figure 3:
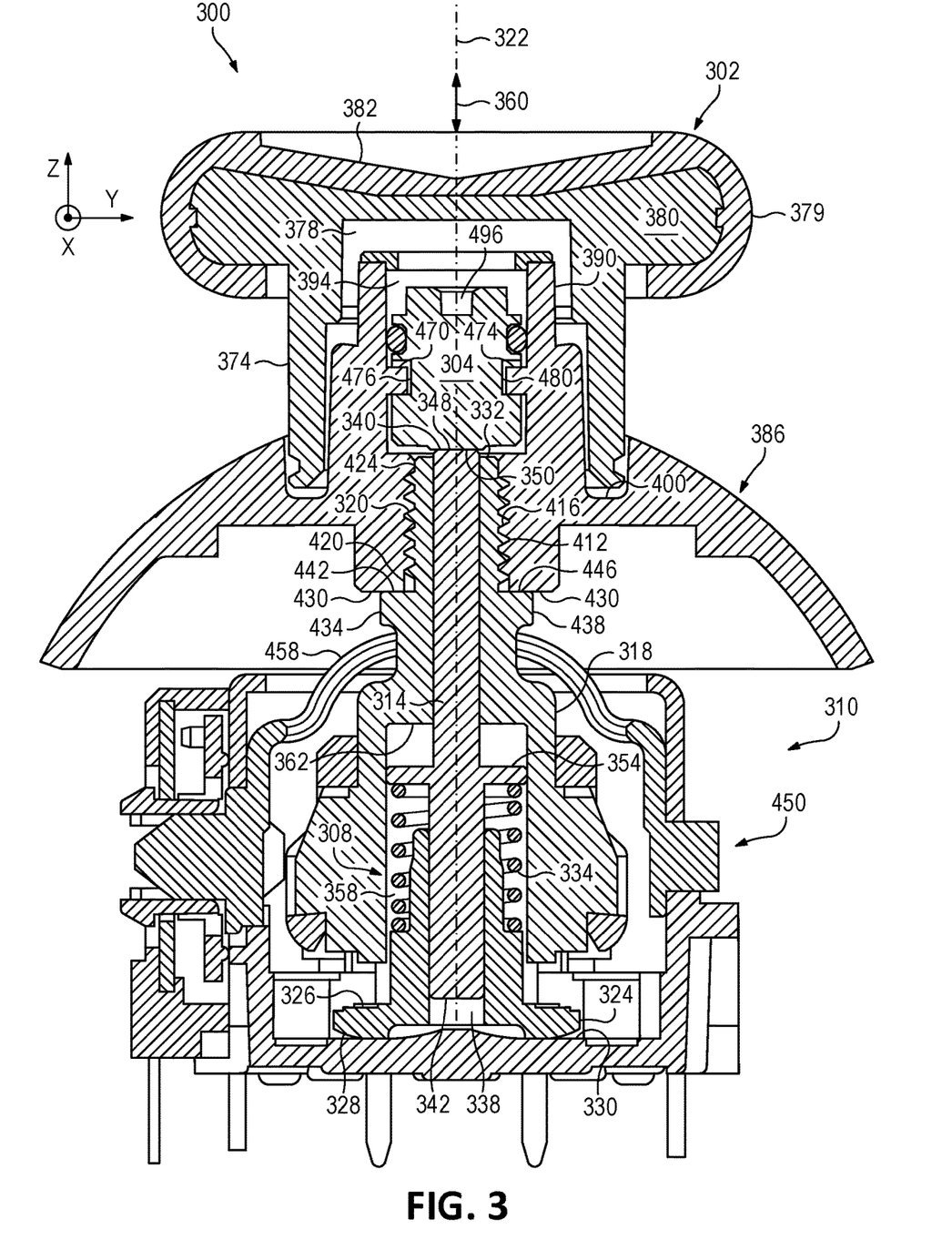
FIG. 3 shows a cross section view of a thumbstick according to examples of the present disclosure.
Figure 4:
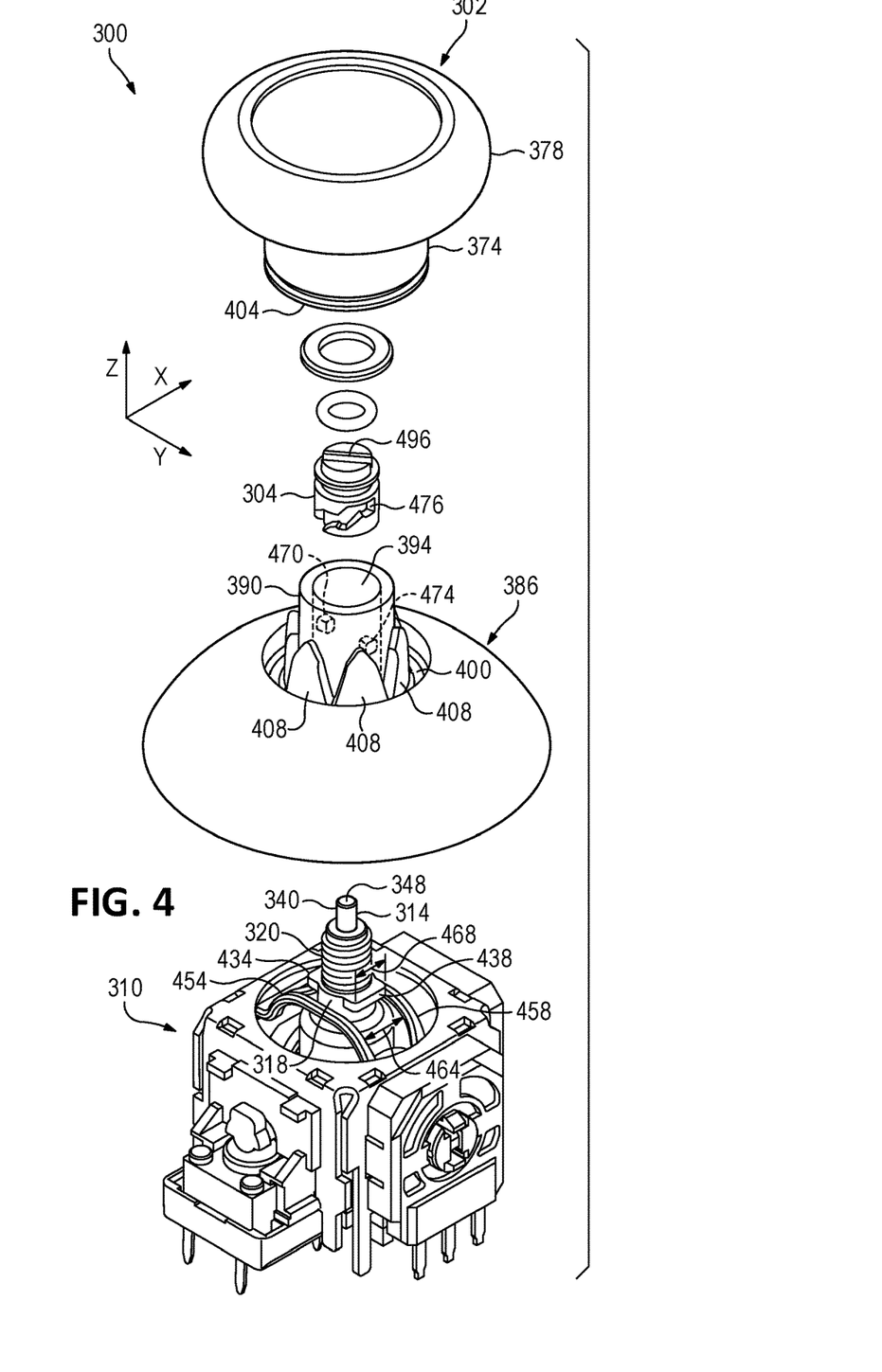
FIG. 4 is an exploded view of the thumbstick of FIG. 3 showing two wings extending radially from the tiltable post according to examples of the present disclosure.

With reference now to FIGS. 3 and 4, a thumbstick 300 according to examples of the present disclosure will now be described. Thumbsticks 130A and 130B of game controller 100 may take the form of thumbstick 300. FIG. 3 shows a cross-sectional view of a portion of thumbstick 300 that comprises a cap 302, an adjustment body 304, a tiltable post 318 and an adjustable tensioning mechanism 308 of a joystick assembly 310. The adjustment body 304 engages a moveable pin 314 of the adjustable tensioning mechanism 308 to adjust a tilt tension of the thumbstick via the tiltable post 318. Additionally and as described in more detail below, the tiltable post 318 is fastened to a base 386 of the thumbstick 300 via threaded engagement in a manner that provides a secure and durable connection, while also enabling adjustment of the tilt tension of the thumbstick.

The joystick assembly 310 is an electronic component that may be mounted on printed circuit board 128 disposed within the housing 102 of game controller 100. The joystick assembly 310 comprises the adjustable tensioning mechanism 308 that is configured to adjust the tilt tension of a tiltable post 318. The moveable pin 314 translates within a post opening 338 along an axis 322 of the tiltable post 318, and protrudes from a distal end 332 of the post to contact the adjustment body 304. As described in more detail below, the tiltable post 318 includes external threads 320 at the distal end 332 that engage with internal threads 416 of the base 386 to reliably and securely fasten the base and cap 302 to the post.

At a proximal end 324 the tiltable post 318 includes a base portion 326 having a rounded disk shaped bottom portion 328 (e.g., curved at the edges, relatively flat at center) that is a pivot surface for the tilting of tiltable post 318 in any of three hundred and sixty (360) degrees from a default "center" position shown in FIG. 3. To provide a centering force that urges the tiltable post 318 back towards its default position, the bottom portion 328 of tiltable post 318 pushes against a bottom plate 330 under the load of compression spring 334.

Joystick assembly 310 includes a plurality of sensors in the form of potentiometers and/or other position detectors (e.g., Hall effect sensors, mechanical switches, optical sensors). The position sensors may utilize continuous electrical activity, or other mechanisms, to generate an analog input control signal based on a position of tiltable post 318 in relation to its default "center" position. For example, joystick assembly 310 may comprise one or more magnets and one or more Hall effect sensors configured to vary an output signal based on the magnetic field produced by the magnet(s). The magnetic field as detected by the Hall effect sensor may vary based on the relative position and/or orientation of the magnet and the sensor.

With continued reference to FIG. 3, pin 314 is configured to adjust the tilt tension of the thumbstick. Pin 314 resides in post opening 338 that extends through the post 318 along axis 322 of the post. As shown in FIG. 3, post opening 338 extends through the base portion 326 and through the distal end 332 of the tiltable post 318. With reference also to FIG. 4, pin 314 has a first end 340 and an opposing second end 342. The first end 340 of pin 314 includes an engagement surface 348 that is contacted by contacting surface 350 of the adjustment body 304. In the example of FIGS. 3 and 4, pin 314 includes a flange 354 (similar to a washer) that extends around at least a portion of a circumference of the pin inside a chamber 358 located within tiltable post 318.

Compression spring 334 coils around the circumference of pin 314 inside the chamber 358. Spring 334 may be compressed between flange 354 and a surface of bottom portion 328 (e.g., a top ledge of bottom portion 328) of the tiltable post 318. Pin 314 is movable along post axis 322 (as indicated by arrow 360) through the post opening 338. Movement of the pin 314 is assisted or opposed by the force exerted by compression spring 334. Pin 314 is moveable from a lowermost z-axis position (at which the adjustment body 304 bottoms out within second cavity 394) to an uppermost z-axis position at which the flange 354 contacts the roof 362 of chamber 358. In this manner, the pin 314 may be repositioned to modify the tilt tension of post 318 to an amount dictated by the amount of compression of spring 334.

In some implementations, flange 354 may be located at second end 342 of pin 314. In some of these implementations, spring 334 may coil beneath pin 314 rather than around pin 314. In some implementations, pin 314 may not have a flange 354, but instead spring 334 may be compressed between the second end 342 of the pin and the plate 330. In general, pin 314 may take any suitable elongated form that serves to compress spring 334. Spring 334 and pin 314 may each be made of any suitable material, such as a metal (e.g., aluminum, steel) or metal alloy, a plastic, a resin, or other material.

Thumbstick 300 includes a cap 302 that comprises a hollow cylindrical stem 374 that defines a first cavity 378. With reference also to FIG. 4, the thumbstick 300 also includes a dome-shaped base 386 to which the cylindrical stem 374 of the cap 302 may be fixedly or removably coupled. With reference to thumbstick 130B in FIG. 2, the cap 302 and stem 374 may be positioned to extend above the thumb-side surface 110 of the housing 102, such as via aperture 140 in the thumb-side surface.

A grip layer 379 comprising a top surface and an opposing bottom surface may be provided over body portion 380 of cap 302 to facilitate manipulation by a user's thumb and/or finger. The top surface is designed to be manipulated by a user's thumb (or finger) and in this example includes a central concave portion 382, although top surface may take any suitable form including convex or flat. Grip layer 379 may be formed from an elastomeric material or any other material that provides a measure of frictional contact with a user's thumb and fingers.

Dome-shaped base 386 includes a hollow first cylindrical portion 390 extending upwardly in a z-axis direction into the first cavity 378 of the cap 302. In this example the first cylindrical portion 390 defines a second cavity 394 (within the first cavity 378 of the cap 302) in which the adjustment body 304 is located. In some examples the base 386 and first cylindrical portion 390 may be formed as a single piece. In other examples the base 386 and first cylindrical portion 390 may be separate pieces that are joined together.

The base 386 includes a ring-shaped groove 400 encircling an upper portion of the base. With reference also to FIG. 4, the circular end 404 of the stem 374 is configured to extend into the groove 400 such that the cap 608 is fixedly mounted with respect to the base 386. In this example, the ring-shaped groove 400 may comprise a plurality of wedges 408 encircling the first cylindrical portion 390. In some examples, the stem 374 may be pressed over the wedges 408 to be secured within the groove 400 via an interference fit with the wedges. In other examples, any suitable method for affixing the stem 374 within groove 400 may be utilized.

Base 386 further includes a second cylindrical portion 412 that is coaxial with the first cylindrical portion 390 about axis 322. Second cylindrical portion 412 comprises internal threads 416 extending between a proximal end 420 of the second cylindrical portion 412 and a distal end 424 of the second cylindrical portion. In this manner, the base 386 may be securely and durably fastened to the tiltable post 318 via the internal threads 416 of the base engaging with the external threads 320 of the tiltable post.

By utilizing such a threaded connection, in some examples of the present disclosure both the base 386 and the tiltable post 318 may be manufactured from a metal or metallic alloy. In this manner, metallic inner thread 416 of second cylindrical portion 412 of base 386 may mate with metallic external threads 320 of tiltable post 318 to securely fasten base and post together. For example, both base 386 and tiltable post 318 may be manufactured from steel. In another example, the base 386 may be steel and the tiltable post 318 may be zinc. Any suitable metal, metallic alloy, or combination thereof may be utilized for the base 386 and tiltable post 318.

In some examples, the external threads 320 of tiltable post 318 may be made of a metal or metallic alloy, while other portions of the post are made from different materials. Similarly, in some examples the internal threads 416 of second cylindrical portion 412 of base 386 may be made of a metal or metal alloy, while other portions of the base are made from different materials. In some examples, tiltable post 318 or base 386 initially may not have threads, and threads may be formed in the non-threaded part by assembling the two parts. For example, internal threads 416 may cut external threads 320 into tiltable post 318, or external threads 320 may cut internal threads 416 into the second cylindrical portion 412 of base 386. In some examples, a thread-locking fluid may be applied to the threads to prevent loosening.

Accordingly, by utilizing a threaded engagement between a metallic base 386 and metallic tiltable post 318, a more robust and durable connection between these components is created. Such durable connection may provide particular benefits with some adjustable tension configurations that may create forces opposing such connection, such as thumbstick 300. In this manner, the useful life of the thumbstick 300 may be increased.

Further, thumbsticks of the present disclosure that utilize a metallic base 386 and metallic tiltable post 318, along with a threaded engagement between the two as described above, may provide a heavier and higher quality user experience and more consistent performance as compared to thumbsticks utilizing plastic or other less substantial materials for similar components. As noted above, in other examples softer materials such as plastic may be utilized for portions of the base 386 and the tiltable post 318.

To further secure the base 386 to the tiltable post 318, the second cylindrical portion 412 also comprises a base anchor feature that abuts a corresponding post anchor feature of the tiltable post. In the example of FIG. 3, the base anchor feature comprises an engagement surface 430 at the proximal end 420 of the second cylindrical portion 412. With reference also to FIG. 4, the post anchor feature of the tiltable post 318 comprises a first wing 434 extending radially from the tiltable post, and a second wing 438 extending radially from the tiltable post and located on the opposite side of the tiltable post from the first wing. Both first wing 434 and second wing 438 are located just below the beginning of the external threads 320 of the tiltable post 318.

First wing 434 comprises a contacting surface 442 and second wing 438 comprises a contacting surface 446 that each face upwardly toward external threads 320. As shown in FIG. 3, the engagement surface 430 of base 386 abuts the contacting surfaces 442 and 446 of the tiltable post 318 to prevent further displacement of the base relative to the tiltable post toward the proximal end 324 of the tiltable post. In this manner, when securing the tiltable post 318 to the base 386, the threaded engagement of external threads 320 and internal threads 416 combined with the engagement surface 430 pressing against contacting surfaces 442 and 446 enables a firm and secure coupling of the base to the tiltable post. In other examples, the post anchor feature may comprise one wing extending radially from the tiltable post, or three or more wings extending from the post for contacting the engagement surface 430 of the base 386.

As shown in FIGS. 3 and 4, thumbstick 300 comprises a control-activation sensor 450 that includes a first arm 454 and a second arm 458 on opposing sides of the tiltable post 318. When a user manipulates the thumbstick 300 in the x-axis direction, the tiltable post 318 correspondingly engages and moves either first arm 454 or second arm 458. Movement of first arm 454 and second arm 458 is detected by electronic sensing components of the control activation sensor 450, and an output signal corresponding to such movement is generated. Movement of the tiltable post in the y-axis direction is similarly detected by the electronic sensing components of control activation sensor 450 via additional movement detection components (not shown) within joystick assembly 310. In other examples, the first arm 454 and second arm 458 may be positioned to cause tiltable post 318 to engage either the first arm or second arm when thumbstick 300 is tilted in the y-direction, and movement in the x-axis direction may be similarly detected via additional movement detection components.

In the example of FIGS. 3 and 4, the first contacting surface 442 and second contacting surface 446 are each located closer to the distal end 332 of the tiltable post 318 along axis 322 than the first arm 454 and a second arm 458. In this manner, the first contacting surface 442 and second contacting surface 446 are positioned above the first arm 454 and second arm 458 when the tiltable post is in its default position.

With reference now to FIG. 4, with the tiltable post 318 in the default position, the first arm 454 and second arm 458 define a gap having a width 464. In this example, both the first contacting surface 442 of first wing 434 and the second contacting surface 446 of the second wing 438 have a width 468 that is less than the width 464 of the gap between the first arm 454 and second arm 458. In this manner, when the tiltable post 318 is installed in joystick assembly 310 from beneath the assembly, the first wing 434 and second wing 438 may conveniently pass through the gap between the arms 454 and 458. This configuration simplifies the process for installing the tiltable post 318 in the joystick assembly 310.

Figure 5:
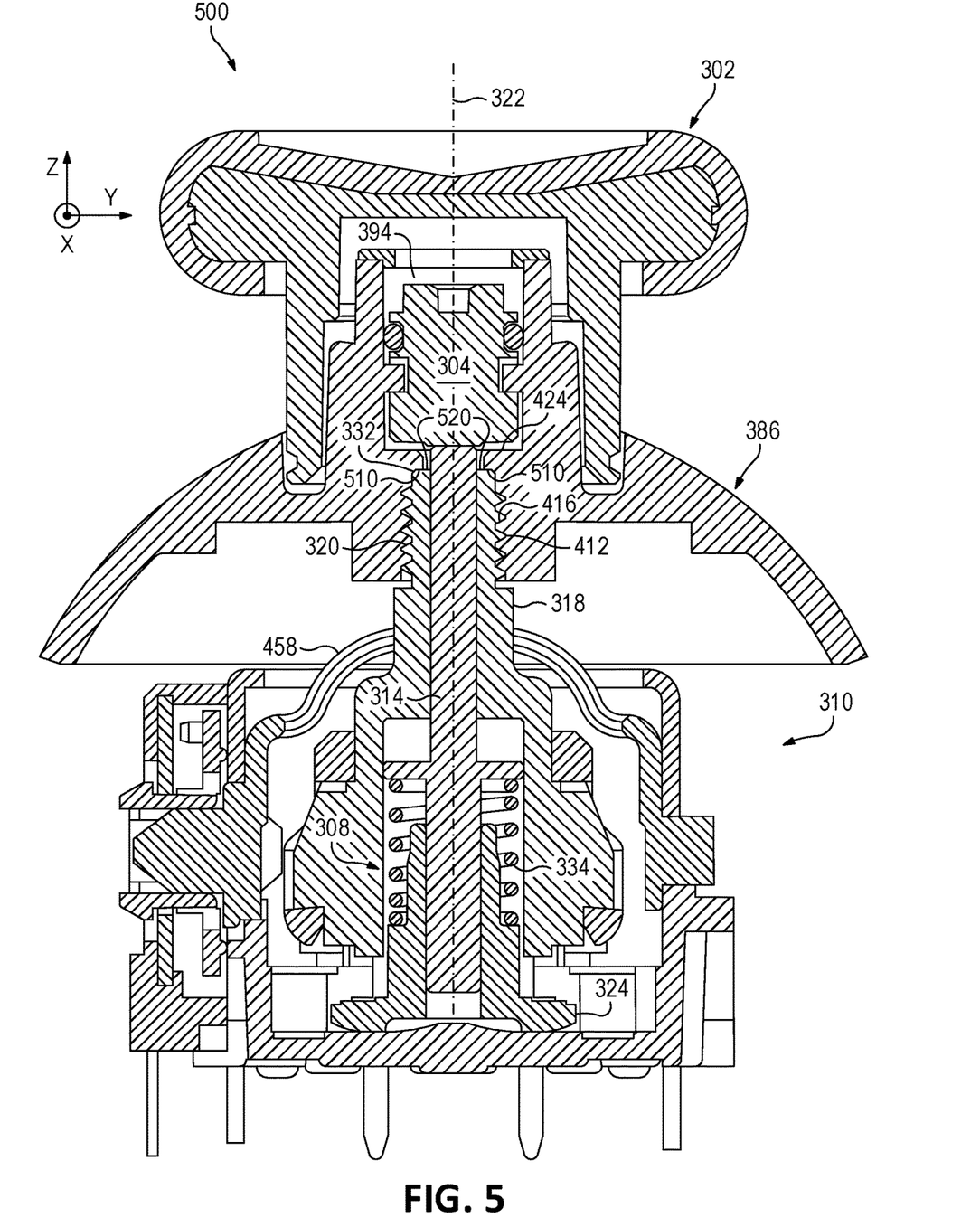
FIG. 5 shows a cross section view of a thumbstick according to other examples of the present disclosure.

With reference now to FIG. 5, another example of a thumbstick 500 comprising a base anchor feature and post anchor feature is illustrated. Thumbsticks 130A and 130B of game controller 100 in FIG. 1 may take the form of thumbstick 500. In this example, the base anchor feature comprises an inwardly extending lip 510 at the distal end 424 of the second cylindrical portion 412 of the base 386. As shown in FIG. 5, the lip 510 is located above the series of internal threads 416 in the z-axis direction. In this configuration, the post anchor feature comprises an engagement surface 520 at the distal end 332 of the tiltable post 318. More particularly, the engagement surface 520 comprises the ringed distal end of the tiltable post 318.

As shown in FIG. 5, the engagement surface 520 of the tiltable post 318 abuts the inwardly extending lip 510 of base 386 to prevent further displacement of the base relative to the tiltable post toward the proximal end 324 of the tiltable post. In this manner, when securing the tiltable post 318 to the base 386, the threaded engagement of external threads 320 and internal threads 416 combined with the engagement surface 520 pressing against inwardly extending lip 510 enables a secure coupling of the base to the tiltable post. As may be seen in FIG. 5, the other components and features of thumbstick 500 may be the same as those for thumbstick 300 illustrated in FIGS. 3 and 4 and described above. For clarity, in FIG. 5 selected reference numerals for such components and features are not shown.

Figure 6:
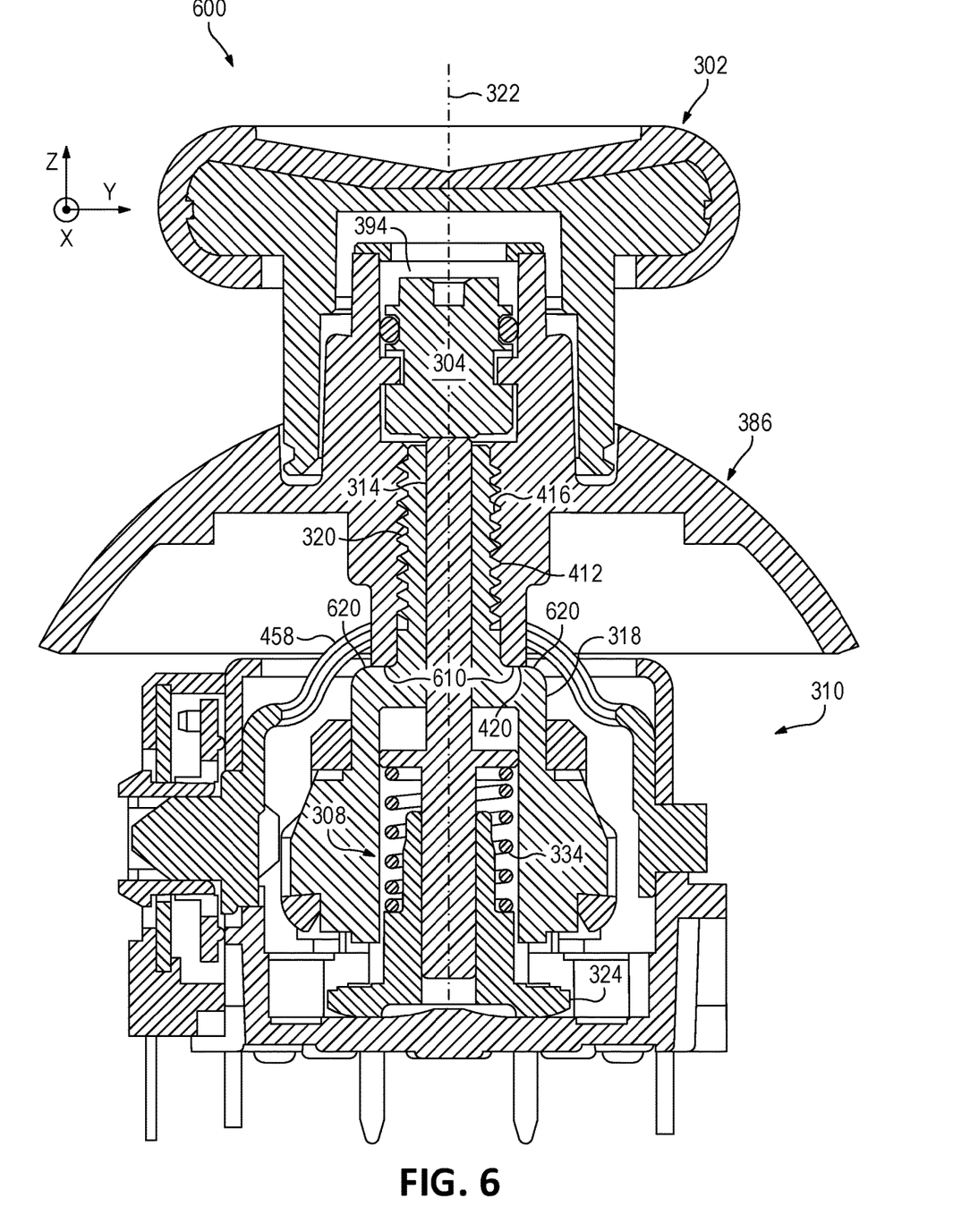
FIG. 6 shows a cross section view of a thumbstick according to other examples of the present disclosure.

With reference now to FIG. 6, another example of a thumbstick 600 comprising a base anchor feature and post anchor feature is illustrated. Thumbsticks 130A and 130B of game controller 100 in FIG. 1 may take the form of thumbstick 600. In this example, the base anchor feature comprises an engagement surface 610 at a proximal end 420 of the second cylindrical portion 412 of the base 386. As shown in FIG. 6, in this example the engagement surface 610 is located below the series of internal threads 416 in the z-axis direction. The engagement surface 610 takes the form of the ringed proximal end of the second cylindrical portion 412 of base 386.

In this configuration, the post anchor feature comprises a radially-extending shoulder 620 located between the external threads 320 and the proximal end 324 of the tiltable post 318. As shown in FIG. 6, the entire ringed engagement surface 610 of the base 386 abuts the radially-extending shoulder 620 of tiltable post 318 to prevent further displacement of the base relative to the tiltable post toward the proximal end 324 of the post. In this manner, when securing the tiltable post 318 to the base 386, the threaded engagement of external threads 320 and internal threads 416 combined with the engagement surface 610 pressing against radially-extending shoulder 620 enables a secure coupling of the base to the tiltable post.

Additionally, by providing the interface between the engagement surface 610 and the radially-extending shoulder 620 at the proximal end 420 of the second cylindrical portion 412 of the base 386, this configuration may enable a longer threaded interface between the tiltable post 318 and the base 386. As shown in FIG. 6, in this example the tiltable post 318 includes nearly twice the number of external threads 320 as compared to the number of external threads in the configuration shown in FIG. 5. Accordingly, the configuration of FIG. 6 may enable thumbstick 600 to embody enhanced structural integrity in the fastening of base 386 to tiltable post 318.

With reference now to FIGS. 3, 4 and 7-11, examples of adjusting the tilt tension of the tiltable post 318 and thumbstick 300 are provided. The following descriptions also are applicable to thumbstick 500 shown in FIG. 5 and thumbstick 600 shown in FIG. 6 and described above. It will be appreciated that the components configured to adjust the tilt tension of thumbsticks 300/500/600, such as adjustment body 304, adjustable tensioning mechanism 308, and joystick assembly 310, are merely examples and numerous variations are possible. For example, adjustment body 304 may utilize different shapes and configurations for the first slot 476 and second slot 480 described below. Accordingly, the principles of the present disclosure may be utilized with various other configurations, components, mechanisms and assemblies for adjusting the tilt tension of a thumbstick.

As shown in FIG. 3, the adjustment body 304 is moveably retained within the second cavity 394 of the first cylindrical portion 390 of base 386, and is configured for both rotation about and translation along the axis 322 of the tiltable post 318. As described in more detail below, spring 334 via the moveable pin 314 urges the adjustment body 304 upwardly in the z-axis direction. FIG. 3 shows the adjustment body 304 positioned close to its downward-most location within second cavity 394, at which location the adjustment body will bottom out. Such downward-most location corresponds to a maximum-tension orientation of the adjustment body 304, which in turn corresponds to a maximum tilt tension setting.

To enable adjustment of the tilt tension of the tiltable post 318, the first cylindrical portion 390 of base 386 includes at least one protuberance that extends laterally into the second cavity 394. The adjustment body 304 includes a corresponding slot recessed into a face 396 of the adjustment body (see also FIG. 9), with the slot extending around a portion of the face. The protuberance of the first cylindrical portion 390 extends into the slot. In this manner, the slot is configured to engage the protuberance when the adjustment body 304 is rotated and translated from a first orientation to a second orientation to adjust the tilt tension of the tiltable post 318.

In the example of FIGS. 3 and 4, the first cylindrical portion 390 of base 386 comprises a first protuberance 470 and a second protuberance 474 that extend laterally into the second cavity 394. The first protuberance 470 extends into a corresponding first slot 476 recessed into the face 396 of the adjustment body 304, with the first slot 476 extending around a portion of the face. The second protuberance 474 extends into a corresponding second slot 480 recessed into the face 396 of the adjustment body 304, with the second slot 480 extending around another portion of the face. The first slot 476 and second slot 480 may have a matching shape, and may be located opposite to one another on the face 396 of the adjustment body 304. In other words, the first slot 476 and second slot 480 may be located 180 degrees from one another around the circumference of the adjustment body 304.

As described in more detail below, during rotation of the adjustment body 304 the first protuberance 470 cooperates with the first slot 476 and the second protuberance 474 cooperates with the second slot 480 to translate the adjustment body against resistance from the adjustable tensioning mechanism (e.g., force exerted by spring 334), and thereby adjust the tilt tension of the tiltable post 318.

In this example, the second protuberance 474 is located opposite to the first protuberance 470 along an interior surface of the first cylindrical portion 390. The first protuberance 470 and second protuberance 474 also may be located at the same height along the z-axis within the first cylindrical portion 390. The first protuberance 470 and second protuberance 474 also may have a matching shape. Accordingly, in this example the following discussion of first slot 476 and first protuberance 470 applies equally to the second slot 480 and second protuberance 474.

As noted above, during rotation of the adjustment body 304, the first protuberance 470 cooperates with the first slot 476 and the second protuberance 474 cooperates with the second slot 480 to translate the adjustment body along the z-axis and thereby adjust the tilt tension of the tiltable post 318. In other examples, 3 or more slot/protuberance pairs may be utilized. For example, in another configuration 4 protuberances spaced 90 degrees from one another and 4 corresponding slots also spaced 90 degrees from one another may be utilized.

Operation of the adjustment body 304 with the adjustable tensioning mechanism 402 according to examples will now be described. With reference to FIGS. 7-11, the first slot 476 comprises a minimum-tension stop surface 482 configured to abut the side face 483 of the first protuberance 470 when the adjustment body 304 is in the minimum-tension orientation. In this manner, the minimum-tension stop surface 482 prevents rotation of the adjustment body 304 in a decreasing-tension direction (counter-clockwise in FIG. 9) to maintain a minimum tilt tension of the thumbstick 300.

As shown in FIGS. 7 and 9-11, a bottom surface 484 of the first slot 476 comprises at least one ramping portion that is inclined away from the distal end 485 of the adjustment body 304. In this example, the bottom surface 484 includes a first ramping portion 486 and a second ramping portion 487. As described in more detail below, the ramping portions are configured to slide against the protuberance when the adjustment body 304 is rotated in an increasing-tension direction (clockwise in FIGS. 9-11 as indicated by arrow C) to thereby translate the adjustment body toward the tiltable post 318 and increase the tilt tension of the tiltable post 318.

Figure 9:
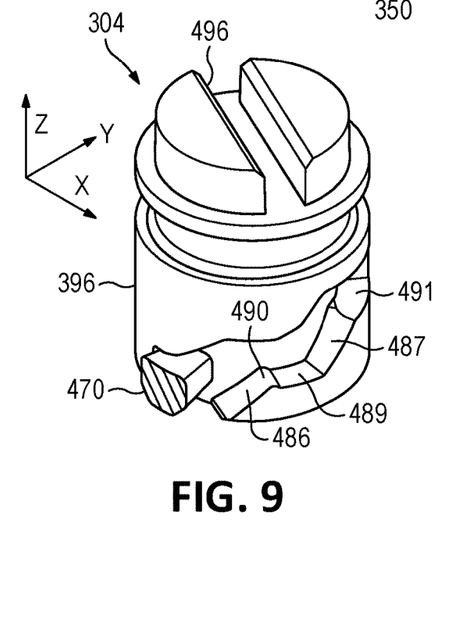
FIG. 9 is a perspective view of the adjustment body and a protuberance of the thumbstick of FIGS. 3, 5 and 6 in a minimum-tension orientation according to examples of the present disclosure.

With reference to FIG. 9, from this minimum-tension orientation when a user rotates the adjustment body 304 in an increasing-tension direction (clockwise), the first ramping portion 486 contacts and slides against the inclined surface 488 of the first protuberance. As the rotation continues, the adjustment body 304 is translated downwardly in a negative z-axis direction (along the axis 322 of tiltable post 318) toward the tiltable post to thereby further compress spring 334 and increase the tilt tension of the thumbstick 600.

Figure 7:
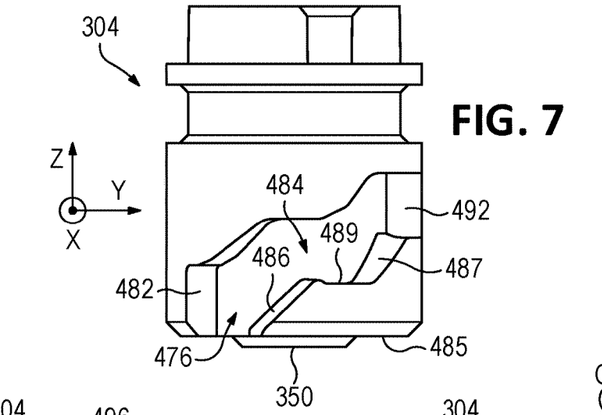
FIG. 7 shows a side view of the adjustment body of FIGS. 3, 5 and 6 according to examples of the present disclosure.
Figure 8:
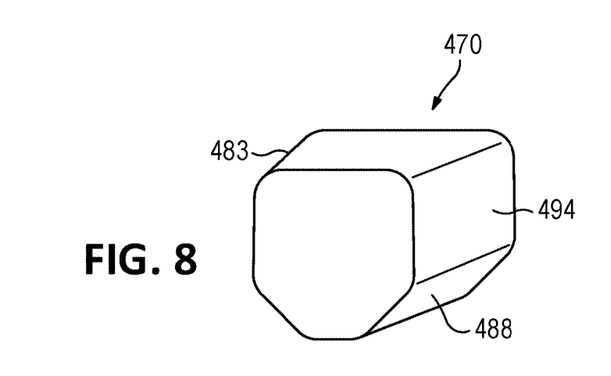
FIG. 8 is a perspective view of a protuberance of the thumbstick of FIGS. 3, 5 and 6 according to examples of the present disclosure.
Figure 10:
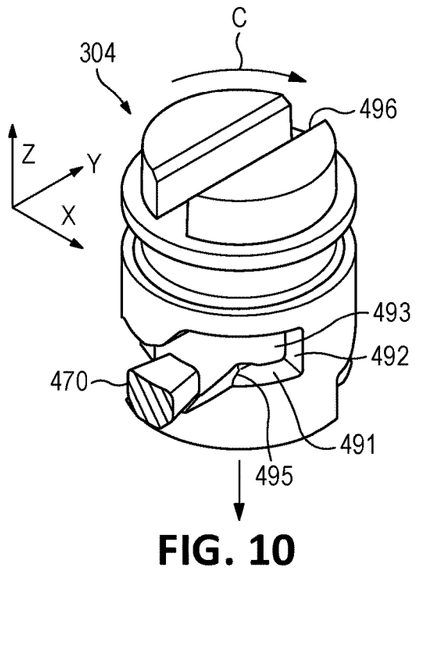
FIG. 10 shows a perspective view of the adjustment body and protuberance of FIG. 9 in another tension orientation greater than the minimum-tension orientation according to examples of the present disclosure.

The first ramping portion 486 of bottom surface 484 transitions to a first flat portion 489 of the bottom surface. As shown in FIG. 7, the first flat portion 489 is elevated in the z-axis direction as compared to the distal end 485 of the adjustment body 304. Accordingly and as shown in FIG. 10, the first flat portion 489 corresponds to an intermediate-tension orientation of the adjustment body 304 in which the first protuberance 470 is located at the first flat portion, and the tilt tension of the tiltable post 318 is greater than the minimum-tension orientation.

In this example and with reference to FIGS. 7 and 9, the first ramping portion 486 transitions to the first flat portion 489 of the bottom surface 484 via a first hump 490. The uppermost surface of the first hump 490 is higher along the z-axis than the flat portion 489. Accordingly, upon the rotation of the adjustment body 304 from the minimum-tension orientation of FIG. 9 to the intermediate-tension orientation of FIG. 10, as the first protuberance 470 passes over the first hump 490, the force from the adjustable tensioning mechanism 402 (e.g., spring 334) seats the first protuberance on the first flat portion 489 of the bottom surface 484.

With this configuration, contact between the first protuberance 470 and the bottom surface 484 may generate tactile feedback, such as a click, tap or other touch-perceptible feedback, that may be felt by the user via the game controller 100. Such tactile feedback also may indicate a selected tilt tension. In this manner, this configuration enables a user to easily adjust, locate and set the tilt tension of the thumbstick 300 to an intermediate-tension setting.

In some examples, the bottom surface 484 of the first slot 476 may comprise a plurality of flat portions that each correspond to a different tilt tension of the tiltable post. In the present example, a second flat portion 491 may be located between the second ramping portion 487 and a maximum-tension stop surface 492. In this example the maximum-tension stop surface 492 is a vertical surface extending from an inner wall 493 of the first slot 476. The maximum-tension stop surface 492 is configured to abut the side face 494 of the first protuberance 470 when the adjustment body 304 is in the maximum-tension orientation shown in FIG. 11. In this manner, the maximum-tension stop surface 492 prevents rotation of the adjustment body 304 in an increasing-tension direction (clockwise in FIG. 11) to maintain a maximum tilt tension of the thumbstick 300.

As with the first ramping portion 486 and first hump 490, the second ramping portion 487 also may transition to the second flat portion 491 of the bottom surface 484 via a second hump 495 in a similar manner. In the maximum-tension orientation shown in FIG. 11, and with reference also to FIGS. 7 and 10, the second flat portion 491 is elevated as compared to the first flat portion 489. Accordingly in this maximum-tension orientation, the adjustment body 304 has been translated downwardly to be closer to the tiltable post 318 than in the intermediate-tension orientation of FIG. 10. It follows that the second flat portion 491 corresponds to a maximum-tension orientation of the adjustment body 304 in which the first protuberance 470 is located at the second flat portion, and the tilt tension of the tiltable post 318 is greater than the intermediate-tension orientation.

Figure 11:
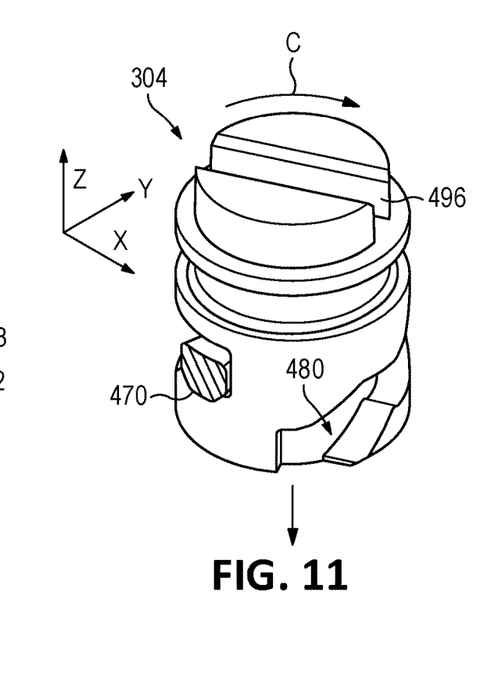
FIG. 11 shows a perspective view of the adjustment body and protuberance of FIG. 9 in a maximum tension orientation according to examples of the present disclosure.

In some examples, between the minimum-tension orientation of FIG. 9 and the maximum tension setting of FIG. 11, the adjustment body 304 may translate a distance along the z-axis of between about 0.7 mm and 1.7 mm, or between about 1.0 mm and about 1.4 mm, or about 1.2 mm. In other examples, any suitable translation distance may be utilized.

Additionally and with reference also to FIGS. 2, 3, 5 and 6, it will be appreciated that thumbstick 300/500/600 enables a user to adjust the thumbstick to a plurality of tilt tension settings without changing a height of the thumbstick relative to the thumb-side surface 110 of the game controller housing 102. In other words, a height H of the thumbstick cap above the surface of a user input device at a first tilt tension is equal to the height H of the cap above the surface of the user input device at a second tilt tension.

With reference again to FIGS. 3 and 4, in some examples the cap 302 of thumbstick 300 may be removable by a user. In this manner, access may be granted to enable a user to rotate the adjustment body 304. In the example of FIGS. 3 and 4, the adjustment body 304 includes a tool-receiving feature that comprises a slot 496 configured to receive the tip of a flat-blade screwdriver or other similar tool. In this manner, a user may engage and rotate the adjustment body 304 with a corresponding tool to adjust the tilt tension of the thumbstick 300. It will be appreciated that many other examples of tool-receiving features and corresponding tools, such as Phillips drives, hex drives, etc., may be utilized with the adjustment body 304.

In other examples, the adjustment body 304 may be rotated directly by the user's thumb/finger to adjust the tilt tension of the thumbstick. For example, a user may grip and rotate the adjustment body 304 at a portion extending above the first cylindrical portion 390 of the base 386. In some examples, the adjustment body 304 may extend further above the first cylindrical portion 390 to facilitate gripping by a user, and/or may include an upper grippable surface, such as a circular knob.

In other examples, the cap 302 may be fixedly attached to the base 386, and may include an aperture centered on axis 322 of the tiltable post 318 through which a user may insert a tool that engages with slot 496 to rotate the adjustment body 304.

In other examples, the cap 302 may be rotatably coupled to the base 386. In these examples the cap 302 may include a key portion that extends downwardly in a z-axis direction into mating slot 496 in the adjustment body 304. In this manner rotation of the cap 302 causes a corresponding rotation and translation of the adjustment body 304 to adjust the tilt tension of the thumbstick.

The following paragraphs provide additional support for the claims of the subject application. One aspect provides a thumbstick for a user input device, comprising: a tiltable post operable to output a control signal based at least in part on a position of the tiltable post relative to a default position, the tiltable post comprising external threads at a distal end, a post anchor feature, and a proximal end opposite to the distal end; an adjustable tensioning mechanism configured to modify a tilt tension of the tiltable post; a cap comprising a cylindrical stem that defines a cavity; and a base that is moveable with the tiltable post, the base comprising: a first cylindrical portion extending into the cavity of the cylindrical stem of the cap; and a second cylindrical portion coaxial with the first cylindrical portion, the second cylindrical portion comprising internal threads and a base anchor feature, wherein the internal threads mate with the external threads of the tiltable post to fasten the tiltable post to the base, and the base anchor feature abuts the post anchor feature of the tiltable post. The thumbstick may additionally or alternatively include, wherein the post anchor feature comprises at least one wing extending radially from the tiltable post and located between the external threads and the proximal end of the tiltable post. The thumbstick may additionally or alternatively include, wherein the base anchor feature comprises an engagement surface at a proximal end of the second cylindrical portion of the base, wherein at least a portion of the engagement surface abuts a contacting surface of the at least one wing. The thumbstick may additionally or alternatively include, wherein the at least one wing comprises two wings extending radially from the tiltable post and located on opposing sides of the tiltable post. The thumbstick may additionally or alternatively a control-activation sensor comprising two arms on opposing sides of the tiltable post, wherein the two wings are located closer to the distal end of the tiltable post along an axis of the tiltable post than the two arms. The thumbstick may additionally or alternatively include, wherein the two arms define a gap having a width, and each of the contacting surfaces of the two wings has a width that is less than the width of the gap. The thumbstick may additionally or alternatively include, wherein the tiltable post comprises a post opening that extends through the post along an axis, and the adjustable tensioning mechanism comprises a pin slidably received in the post opening and configured to adjust the tilt tension of the thumbstick. The thumbstick may additionally or alternatively include, wherein the base anchor feature comprises an inwardly extending lip at a distal end of the second cylindrical portion of the base, and the post anchor feature comprises an engagement surface at the distal end of the tiltable post. The thumbstick may additionally or alternatively include, wherein the base anchor feature comprises an engagement surface at a proximal end of the second cylindrical portion of the base, and the post anchor feature comprises a radially-extending shoulder located between the external threads and the proximal end of the tiltable post.

Another aspect provides a user input device, comprising: a housing that defines an internal chamber and includes an aperture; and a thumbstick having a portion that extends from the aperture, the thumbstick comprising: a tiltable post operable to output a control signal based at least in part on a position of the tiltable post relative to a default position, the tiltable post comprising external threads at a distal end, a post anchor feature, and a proximal end opposite to the distal end; an adjustable tensioning mechanism disposed within the chamber and configured to modify a tilt tension of the tiltable post; a cap comprising a cylindrical stem that defines a cavity; and a base that is moveable with the tiltable post, the base comprising: a first cylindrical portion extending into the cavity of the cylindrical stem of the cap; and a second cylindrical portion coaxial with the first cylindrical portion, the second cylindrical portion comprising internal threads and a base anchor feature, wherein the internal threads mate with the external threads of the tiltable post to fasten the tiltable post to the base, and the base anchor feature abuts the post anchor feature of the tiltable post. The user input device may additionally or alternatively include, wherein the post anchor feature comprises at least one wing extending radially from the tiltable post and located between the external threads and the proximal end of the tiltable post. The user input device may additionally or alternatively include, wherein the base anchor feature comprises an engagement surface at a proximal end of the second cylindrical portion of the base, the engagement surface abutting a contacting surface of the at least one wing. The user input device may additionally or alternatively include, wherein the at least one wing comprises two wings extending radially from the tiltable post and located on opposing sides of the tiltable post. The user input device may additionally or alternatively include, wherein the thumbstick further comprises a control-activation sensor comprising two arms on opposing sides of the tiltable post, wherein the two wings are located closer to the distal end of the tiltable post along an axis of the post than the two arms. The user input device may additionally or alternatively include, wherein the two arms define a gap having a width, and each of the contacting surfaces of the two wings has a width that is less than the width of the gap. The user input device may additionally or alternatively include, wherein the tiltable post comprises a post opening that extends through the post along an axis, and the adjustable tensioning mechanism comprises a pin slidably received in the post opening and configured to adjust the tilt tension of the thumbstick. The user input device may additionally or alternatively include, wherein the base anchor feature comprises an inwardly extending lip at a distal end of the second cylindrical portion of the base, and the post anchor feature comprises an engagement surface at the distal end of the tiltable post. The user input device may additionally or alternatively include, wherein the base anchor feature comprises an engagement surface at a proximal end of the second cylindrical portion of the base, and the post anchor feature comprises a radially-extending shoulder located between the external threads and the proximal end of the tiltable post.

Another aspect provides a thumbstick for a user input device, comprising: a tiltable post operable to output a control signal based at least in part on a position of a tiltable post relative to a default position, the tiltable post comprising: external threads at a distal end; a proximal end opposite to the distal end; and two wings extending radially from the tiltable post and located on opposing sides of the tiltable post, the two wings located between the external threads and the proximal end of the tiltable post; an adjustable tensioning mechanism configured to modify a tilt tension of the tiltable post; a cap comprising a cylindrical stem that defines a cavity; and a base that is moveable with the tiltable post, the base comprising: a first cylindrical portion extending into the cavity of the cylindrical stem of the cap; and a second cylindrical portion coaxial with the first cylindrical portion, the second cylindrical portion comprising internal threads and an engagement surface at a proximal end of the second cylindrical portion, wherein the internal threads mate with the external threads of the tiltable post to fasten the tiltable post to the base, and the engagement surface abuts the two wings of the tiltable post. The user input device may additionally or alternatively include a control-activation sensor comprising two arms on opposing sides of the tiltable post, wherein the two wings are located closer to the distal end of the tiltable post along an axis of the post than the two arms.

It will be understood that the configurations and/or approaches described herein are exemplary in nature, and that these specific embodiments or examples are not to be considered in a limiting sense, because numerous variations are possible. The subject matter of the present disclosure includes all novel and non-obvious combinations and subcombinations of the various components, configurations, and other features, functions, acts, and/or properties disclosed herein, as well as any and all equivalents thereof.

The invention claimed is:

1. A thumbstick for a user input device, comprising:
   a tiltable post operable to output a control signal based at least in part on a position of the tiltable post relative to a default position, the tiltable post comprising external threads at a distal end, a post anchor feature, and a proximal end opposite to the distal end;
   an adjustable tensioning mechanism configured to modify a tilt tension of the tiltable post;
   a cap comprising a cylindrical stem that defines a cavity; and
   a base that is moveable with the tiltable post, the base comprising:
      a first cylindrical portion extending into the cavity of the cylindrical stem of the cap; and
      a second cylindrical portion coaxial with the first cylindrical portion, the second cylindrical portion comprising internal threads and a base anchor feature, wherein the internal threads mate with the external threads of the tiltable post to fasten the tiltable post to the base, and the base anchor feature abuts the post anchor feature of the tiltable post.

2. The thumbstick of claim 1, wherein the post anchor feature comprises at least one wing extending radially from the tiltable post and located between the external threads and the proximal end of the tiltable post.

3. The thumbstick of claim 2, wherein the base anchor feature comprises an engagement surface at a proximal end of the second cylindrical portion of the base, wherein at least a portion of the engagement surface abuts a contacting surface of the at least one wing.

4. The thumbstick of claim 2, wherein the at least one wing comprises two wings extending radially from the tiltable post and located on opposing sides of the tiltable post.

5. The thumbstick of claim 4, wherein the thumbstick further comprises a control-activation sensor comprising two arms on opposing sides of the tiltable post, wherein the two wings are located closer to the distal end of the tiltable post along an axis of the tiltable post than the two arms.

6. The thumbstick of claim 5, wherein the two arms define a gap having a width, and each of the contacting surfaces of the two wings has a width that is less than the width of the gap.

7. The thumbstick of claim 1, wherein the tiltable post comprises a post opening that extends through the post along an axis, and the adjustable tensioning mechanism comprises a pin slidably received in the post opening and configured to adjust the tilt tension of the thumbstick.

8. The thumbstick of claim 1, wherein the base anchor feature comprises an inwardly extending lip at a distal end of the second cylindrical portion of the base, and the post anchor feature comprises an engagement surface at the distal end of the tiltable post.

9. The thumbstick of claim 1, wherein the base anchor feature comprises an engagement surface at a proximal end of the second cylindrical portion of the base, and the post anchor feature comprises a radially-extending shoulder located between the external threads and the proximal end of the tiltable post.

10. A user input device, comprising:
   a housing that defines an internal chamber and includes an aperture; and a thumbstick having a portion that extends from the aperture, the thumbstick comprising:
  a tiltable post operable to output a control signal based at least in part on a position of the tiltable post relative to a default position, the tiltable post comprising external threads at a distal end, a post anchor feature, and a proximal end opposite to the distal end;
  an adjustable tensioning mechanism disposed within the chamber and configured to modify a tilt tension of the tiltable post;
  a cap comprising a cylindrical stem that defines a cavity; and
  a base that is moveable with the tiltable post, the base comprising:
    a first cylindrical portion extending into the cavity of the cylindrical stem of the cap; and
    a second cylindrical portion coaxial with the first cylindrical portion, the second cylindrical portion comprising internal threads and a base anchor feature, wherein the internal threads mate with the external threads of the tiltable post to fasten the tiltable post to the base, and the base anchor feature abuts the post anchor feature of the tiltable post.

11. The user input device of claim 10, wherein the post anchor feature comprises at least one wing extending radially from the tiltable post and located between the external threads and the proximal end of the tiltable post.

12. The user input device of claim 11, wherein the base anchor feature comprises an engagement surface at a proximal end of the second cylindrical portion of the base, the engagement surface abutting a contacting surface of the at least one wing.

13. The user input device of claim 11, wherein the at least one wing comprises two wings extending radially from the tiltable post and located on opposing sides of the tiltable post.

14. The user input device of claim 13, wherein the thumbstick further comprises a control-activation sensor comprising two arms on opposing sides of the tiltable post, wherein the two wings are located closer to the distal end of the tiltable post along an axis of the post than the two arms.

15. The user input device of claim 14, wherein the two arms define a gap having a width, and each of the contacting surfaces of the two wings has a width that is less than the width of the gap.

16. The user input device of claim 10, wherein the tiltable post comprises a post opening that extends through the post along an axis, and the adjustable tensioning mechanism comprises a pin slidably received in the post opening and configured to adjust the tilt tension of the thumbstick.

17. The user input device of claim 10, wherein the base anchor feature comprises an inwardly extending lip at a distal end of the second cylindrical portion of the base, and the post anchor feature comprises an engagement surface at the distal end of the tiltable post.

18. The user input device of claim 10, wherein the base anchor feature comprises an engagement surface at a proximal end of the second cylindrical portion of the base, and the post anchor feature comprises a radially-extending shoulder located between the external threads and the proximal end of the tiltable post.

19. A thumbstick for a user input device, comprising:
  a tiltable post operable to output a control signal based at least in part on a position of a tiltable post relative to a default position, the tiltable post comprising:
    external threads at a distal end;
    a proximal end opposite to the distal end; and
    two wings extending radially from the tiltable post and located on opposing sides of the tiltable post, the two wings located between the external threads and the proximal end of the tiltable post;
  an adjustable tensioning mechanism configured to modify a tilt tension of the tiltable post;
  a cap comprising a cylindrical stem that defines a cavity; and
  a base that is moveable with the tiltable post, the base comprising:
    a first cylindrical portion extending into the cavity of the cylindrical stem of the cap; and
    a second cylindrical portion coaxial with the first cylindrical portion, the second cylindrical portion comprising internal threads and an engagement surface at a proximal end of the second cylindrical portion, wherein the internal threads mate with the external threads of the tiltable post to fasten the tiltable post to the base, and the engagement surface abuts the two wings of the tiltable post.

20. The thumbstick of claim 19, further comprising a control-activation sensor comprising two arms on opposing sides of the tiltable post, wherein the two wings are located closer to the distal end of the tiltable post along an axis of the post than the two arms.

* * * * *